United States Patent [19]
Vosteen

[11] 3,873,919
[45] Mar. 25, 1975

[54] AC ELECTRIC FIELDMETER
[76] Inventor: Robert E. Vosteen, 315 W. Center St., Medina, N.Y. 14103
[22] Filed: Feb. 11, 1974
[21] Appl. No.: 441,067

[52] U.S. Cl............... 324/72, 324/76 A, 324/123 C
[51] Int. Cl............................................. G01r 31/02
[58] Field of Search........ 324/32, 72, 123 R, 123 C, 324/83, 140, 141

[56] References Cited
UNITED STATES PATENTS
| 3,644,828 | 2/1972 | Gathman | 324/123 R |
| 3,667,036 | 5/1972 | Seachman | 324/72 |
| 3,753,117 | 8/1973 | Downing | 324/72 |

Primary Examiner—Alfred E. Smith
Assistant Examiner—Michael J. Tokar
Attorney, Agent, or Firm—Albert J. Santorelli

[57] ABSTRACT

An instrument for measuring AC electric field intensity which is portable and easily operable. The instrument includes a pair of sensitive electrodes connected to a differential operational amplifier, and provides a measurement which within its operating range, is not a function of the frequency of the electric field. The instrument provides long term stability and is self-contained.

20 Claims, 2 Drawing Figures

PATENTED MAR 25 1975 3,873,919

AC ELECTRIC FIELDMETER

BACKGROUND OF THE INVENTION

Field of the Invention

The invention relates to an instrument for measuring AC electric field intensity, and has particular utility for determining whether electric field intensities are in a range that might cause biological damage to humans.

SUMMARY OF THE DISCLOSURE

Recent studies have revealed a real possibility of biological damage to humans routinely exposed to intense electric fields for extended periods. Such high intensity electric fields, for example, are produced by high voltage power distribution lines and devices. It is therefore an object of this invention to provide an instrument which is portable and easily operable for the measurement of AC electric field intensity.

It is another object of this invention to provide an instrument for accurately measuring electric field intensity, which is independent of the frequency of the electric field under measurement within the operating range of the instrument.

Is is another object of this invention to provide an instrument for measuring electric field intensity, which does not distort the electric field under measurement or otherwise produce inaccurate measurements.

The electric field intensity is a measure of the energy stored per unit volume in the immediate vicinity of the point in space under investigation. At any point or volume which is small in comparison with the geometry of its electric field source, the electric field can be considered constant and uniform in direction. In this circumstance, the electric field for analytical purposes can be represented by the electric field between two infinite parallel plates at a fixed spacing and with a fixed potential applied between the plates.

In this latter simplified case, the electric field intensity $\vec{E}$ is expressed simply as:

$$\vec{E} = V/l$$

where
$V$ = the voltage applied between the plates, and
$l$ = the spacing between the plates.
The electric field intensity $\vec{E}$ is, of course, directional and perpendicular to the plates in this case.

If a thin plane surface were placed within the volume defined between the plates, with its plane surface parallel to the plates, no electric field distortion would exist because within this plane all points are at equal potential. It similarly follows that if the plane surface were of finite thickness but small compared to the spacing between the plates that the resulting field distortion would be minimal.

If now this plane surface of finite thickness were composed of two plane conductive surfaces electrically isolated from one another but with a small resistance connected between them, conventional electrical theory dictates that we would have a series circuit of two capacitors with a small resistance connected between them. In this regard, each plane conductive surface would form a capacitor with its oppositely positioned plate. A current would flow in the resistance determined by the voltage and its frequency applied between the plates, and the capacitances of the two capacitors. So long as this resistance were very small compared to the capacitive reactances of the two capacitors, the effect of the resistance would be negligible, but the voltage drop across this resistance would clearly indicate the strength of the electric field in which these capacitor plates were immersed. The voltage drop across the resistance would, however, increase linearly with frequency in the presence of a constant alternating field intensity of varying frequency, which would cause an inaccurate measurement of field intensity.

The fieldmeter instrument according to the invention however takes a different approach and provides a measurement of electric field intensity which, within its operating range, is independent of the frequency of the electric field. The fieldmeter includes two sensitive electrodes in the form of plates, which are immersed in the electric field at the point where the electric field intensity is to be measured. Assuming the fieldmeter to possess no initial charge and assuming it is electrically isolated from ground, the sensitive electrodes will have equal incident electric fields of opposite polarity and therefore equal and opposite charges induced upon them. One of the sensitive electrodes feeds the minus input of an operational amplifier, and a first capacitor is connected between the minus input and the amplifier output. The other sensitive electrode feeds the plus input of the operational amplifier, and a second capacitor is connected between the plus input and circuit common. This configuration constitutes a differential integrator, integrating the differential current feeding the summing junction. It produces an output voltage proportional to the differential charge feeding the summing junction with the charge being independent of electric field frequency, thus providing an output which is independent of the frequency of the electric field.

Each of the first and second capacitors is shunted by a network which provides long term stability of the operational amplifier, and a suitably calibrated meter is connected to the output of the operational amplifier to provide the desired reading of the intensity of the electric field under measurement.

DETAILED DESCRIPTION OF THE INVENTION

Figure 1:
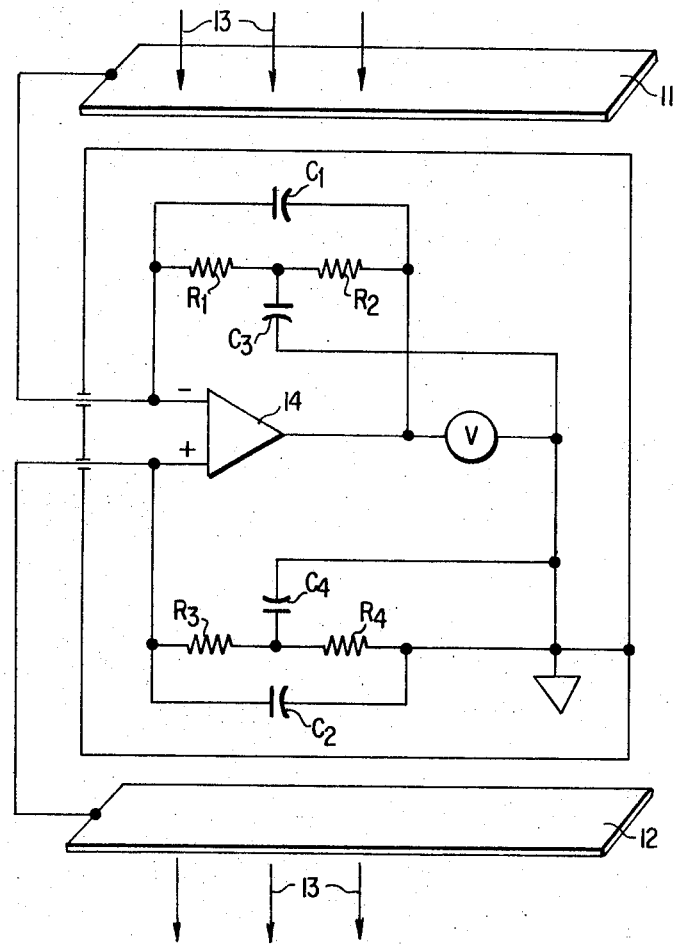
FIG. 1 is an electrical schematic diagram of the circuit of the instrument according to the invention.

FIG. 1 shows the electrical circuit of the fieldmeter instrument according to the invention. The instrument is positioned in the electric field at the point where it is desired to measure the electric field intensity. Because an electric field is directional, the instrument is also directional and must be oriented with its sensitive eletrodes 11 and 12 perpendicular to the electric field, indicated by the imaginary lines 13. The sensitive electrodes 11 and 12 are shown as comprising identical thin rectangular plates, which are spaced and positioned in parallel planes, perpendicular to the electric field.

As explained heretofore, each of sensitive electrodes 11 and 12 may be considered as comprising a parallel plate capacitor together with the plates of the electric field source opposite thereto. Considering a parallel plate air dielectric capacitor of area $A$, plate spacing $l$, dielectric constant $K_o$, charge $Q$ and surface charge density $\sigma$, and neglecting fringing:

$$C = (K_o A)/l$$
$$Q = CV$$
$$\sigma = Q/A = (C/A)\,V = (K_o A/Al)\,V = (K_o V)/l$$

therefore $$V/l = \sigma/K_o$$

Thus as the electric field intensity is by definition for this geometry:

$$\vec{E} = V/l,$$

then $$\vec{E} = \sigma/K_o$$

Thus for the electric fieldmeter of this invention, the above expression will dictate the charge density induced upon a sensitive electrode by a given incident electric field. Under normal circumstances, the electric field is uniform over the area $A$ of the sensitive electrode, and therefore the total charge induced on the sensitive electrode may be calculated as follows:

$$Q = \sigma A = K_o \vec{E} A$$

Inasmuch as $K_o$ and $A$ are constants, the charge $Q$ induced on each sensitive electrode is directly proportional to the electric field intensity $E$, and is not a function of the frequency of the electric field. Assuming the fieldmeter to possess no initial charge and assuming the structure is electrically isolated from ground, sensitive electrodes 11 and 12 will have equal incident electric fields of opposite polarity and therefore equal and opposite charges induced upon them.

Electrode 11 feeds the minus input of operational amplifier 14, and integrating capacitor C1, is connected between the minus input and the amplifier output. Similarly, electrode 12 feeds the plus input of operational amplifier 14, and integrating capacitor C2, identical to capacitor C1 is connected between the plus input and circuit common. This circuit thus constitutes a differential integrator, integrating the differential current feeding the summing junction at the inputs of the operational amplifier. The output voltage is proportional to the differential charge feeding the summing junction, the charge being independent of frequency as explained above. The output voltage of the operational amplifier is therefore independent of the frequency of the electric field.

In order to prevent drift and provide long term stability of the operational amplifier, capacitors C1 and C2 may be shunted by separate resistors (not shown) which will leak off any DC charge that may be accumulated on plates 11 and 12, but which have an impedance that is very high compared to the capacitive reactance of capacitors C1 and C2 at the lowest frequency of electric fields to be measured. This resistive shunt connection may be utilized because we are only interested in the AC component of the electric field intensity, and not in any DC component that might be present.

As an alternative to the described use of shunt resistors, FIG. 1 shows a T-network shunting each of capacitors C1 and C2. Resistors R1 and R2 are thus connected in series across capacitor C1, and capacitor C3 is connected between the series connection of resistors R1 and R2 and circuit common, to form a first T-network. Resistors R1 and R2 are of equal resistance values. An identical T-network comprising resistors R3 and R4, and capacitor C4 shunts capacitor C2. The relative values of the resistors and capacitor comprising the T networks are chosen to provide a relative low shunt resistance to DC components of the electric field intensity, while still maintaining a very high shunt impedance at the lowest frequency of the electric fields being measured. The design of T-networks to result in these characteristics are conventional in the art and are therefore not detailed herein.

A calibrated AC voltmeter V is connected between the output of the operational amplifier and circuit common to indicate the electric field intensity. The instrument thus functions as an AC electric fieldmeter.

It is generally desired, in determining possible biological damage to humans, to measure electric field intensity at a point approximately 4 feet from ground level (normal human shoulder height) as opposed to the electric field intensity at ground level. If the instrument is grounded at the 4 foot high position, a significant distortion of the electric field in the vicinity of the instrument will occur. The instrument should therefore be small and completely self-contained to be capable of assuming the potential at any instant of the point in space occupied by the fieldmeter.

Figure 2:
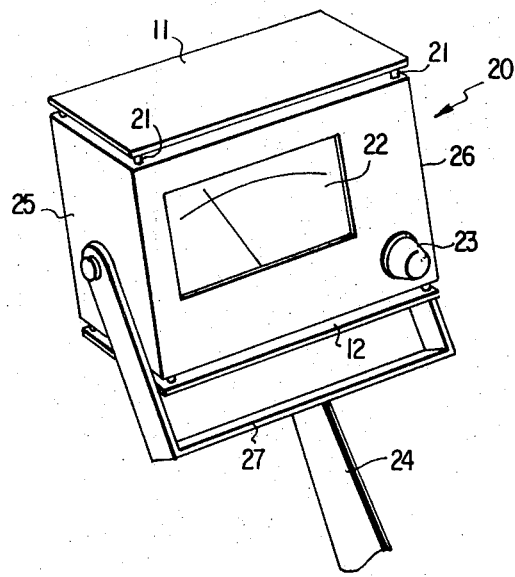
FIG. 2 is an isometric view of the instrument including its case according to the invention.

FIG. 2 shows the instrument as being enclosed in a metallic case 20 which provides an isopotential surface. This provides the electrostatic shield shown in FIG. 1 which prevents outside fields from distorting the measurement. The case should be small in comparison to its surroundings and thus cause a minimal distortion to the field in which it is immersed.

Sensitive electrodes 11 and 12 are positioned outside case 20, at the top and bottom, respectively, thereof. They are mounted to the case by electrically insulated mounting means 21. A conventional visual indicator 22 and on-off switch 23 are provided on the face of case 20. The indicator 22 should be of such size that it can be read at a suitable distance with adequate accuracy. As heretofore stated, the unit should be self-contained including batteries (not shown) for powering the circuitry.

The instrument is typically hand held at the end of a long insulated handle 24. Mounting means 25 and 26 rotatably connect the instrument to U-shaped support means 27 at opposite sides of the instrument, with handle 24 being connected to the mid-section of support means 27. The instrument can then be located by the operator holding the end of handle 24 at the point where the electric field intensity is desired to be measured. It will rotate because of its center of gravity about mounting means 25 and 26 to a position wherein sensitive electrodes 11 and 12 are perpendicular to the electric field. As an electric field is directional, similarly this instrument is directional and must be oriented with its sensitive electrodes perpendicular to the incident field. This is accomplished by rotating the instrument in mutually perpendicular planes for maximum indication.

The instrument described is a differential AC fieldmeter. If measurements with respect to electric ground only are desired, the instrument can be simplified by omitting the lower sensitive electrode 12 and connecting the amplifier "plus" input to circuit common, connecting the instrument's metallic base to circuit common, and eliminating all components shorted out by this connection.

What is claimed is:

1. An instrument to measure the intensity of an AC electric field comprising:
   first and second sensitive electrodes positionable in the electric field at the point at which the electric field intensity is desired to be determined to cause equal and opposite electrical charges to be induced thereon,
   an operational amplifier having plus and minus inputs and an output, the first sensitive electrode being connected to the minus input and the second sensitive electrode being connected to the plus input,
   first and second integrating means, the first integrating means being connected between the output of the operational amplifier and the minus input; a circuit common, the second integrating means being connected between the circuit common and the plus input to thereby provide a differential integrator circuit to produce an output voltage between the output of the operational amplifier and the circuit common, proportional to the differential charge induced on the first and second sensitive electrodes.

2. An instrument to measure the intensity of an AC electric field as recited in claim 1 further comprising:
   an electrostatic shield connected to circuit common surrounding the operational amplifier and the first and second integrating means.

3. An instrument to measure the intensity of an AC electric field as recited in claim 2 further comprising:
   indicator means connected between the output of the operational amplifier and circuit common to provide an indication of the intensity of the electric field.

4. An instrument to measure the intensity of an AC electric field as recited in claim 3 further comprising:
   resistive means respectively connected across the first and second integrating means to bypass any DC electric field components induced on the first and second sensitive electrodes.

5. An instrument to measure the intensity of an AC electric field as recited in claim 4 wherein the first and second sensitive electrodes comprise plates positioned perpendicular to the electric field under measurement.

6. An instrument to measure the intensity of an AC electric field as recited in claim 5 further comprising:
   a casing to house the operational amplifier, first and second integrating means, first and second resistive means and the indicator means, the first and second sensitive electrodes being mounted to the top and bottom respectively of the casing through electrically insulating means.

7. An instrument to measure the intensity of an AC electric field as recited in claim 6 further comprising:
   support means connected to opposite sides of the casing, a handle connected to the support means whereby an operator may manually immerse the instrument at the point in the electric field at which the intensity is designed to be measured.

8. An instrument to measure the intensity of an AC electric field as recited in claim 7 wherein the indicator means are mounted on the face of the casing for reading by the operator.

9. An instrument to measure the intensity of an AC electric field as recited in claim 1 further comprising a T-network comprising first and second resistors and a capacitor connected to each of the first and second integrating means to bypass any DC electric field components induced on the first and second sensitive electrodes.

10. An instrument to measure the intensity of an AC electric field with respect to ground comprising a sensitive electrode positionable in the electric field at the point at which the electric field intensity is desired to be determined to cause an electrical charge to be induced thereon,
    an operational amplifier having plus and minus inputs and an output, the sensitive electrode being connected to the minus input,
    integrating means connected between the output of the operational amplifier and the minus input; a ground connection, being connected to the plus input to thereby provide an integrator circuit to produce an output voltage between the output of the operational amplifier and ground proportional to the charge induced on the sensitive electrode,
    a casing to house the operational amplifier and the integrating means, the sensitive electrode being mounted to the casing through electrically insulating means, and
    support means connected to opposite sides of the casing, a handle connected to the support means whereby an operator may manually immerse the instrument at the point in the electric field at which the intensity is desired to be measured.

11. An instrument to measure the intensity of an AC electric field as recited in claim 10 wherein the handle is pivotally connected to the support means.

12. An instrument to measure the intensity of an AC electric field as recited in claim 11 further comprising:
    indicator means connected between the output of the operational amplifier and ground connection to provide an indication of the intensity of the electric field.

13. An instrument to measure the intensity of an AC electric field as recited in claim 12 wherein the indicator means are mounted on the face of the casing for reading by the operator.

14. An instrument to measure the intensity of an AC electric field as recited in claim 13 further comprising:
    an electrostatic shield connected to the ground connection surrounding the operational amplifier and the integrating means.

15. An instrument to measure the intensity of an AC electric field as recited in claim 14 wherein the sensitive electrode comprises a plate positioned perpendicularly to the electric field under measurement.

16. An instrument to measure the intensity of an AC electric field as recited in claim 15 further comprising:
    resistive means connected across the integrating means to bypass any DC electric field components induced on the sensitive electrode.

17. An instrument to measure the intensity of an AC electric field as recited in claim 15 further comprising a T-network comprising first and second resistors and a capacitor connected to the integrating means to bypass any DC electric field components induced on the sensitive electrode.

18. An instrument to measure the intensity of an AC electric field as recited in claim 3 further comprising:
    a casing to house the operational amplifier, first and second integrating means and the indicator means, the first and second sensitive electrodes being mounted to the top and bottom respectively of the casing through electrically insulating means.

19. An instrument to measure the intensity of an AC electric field as recited in claim 18 further comprising: support means connected to opposite sides of the casing, a handle connected to the support means whereby an operator may manually immerse the instrument at the point in the electric field at which the intensity is designed to be measured.

20. An instrument to measure the intensity of an AC electric field as recited in claim 19 wherein the indicator means are mounted on the face of the casing for reading by the operator.

* * * * *